US008234297B2

(12) United States Patent
He

(10) Patent No.: US 8,234,297 B2
(45) Date of Patent: Jul. 31, 2012

(54) EFFICIENT COMPUTATION OF TOP-K AGGREGATION OVER GRAPH AND NETWORK DATA

(75) Inventor: Bin He, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 12/714,729

(22) Filed: Mar. 1, 2010

(65) Prior Publication Data

US 2011/0213801 A1 Sep. 1, 2011

(51) Int. Cl.
*G06F 7/00* (2006.01)

(52) U.S. Cl. ........................................ 707/770
(58) Field of Classification Search .................. 707/770
See application file for complete search history.

(56) References Cited

U.S. PATENT DOCUMENTS

| 7,080,063 | B2 | 7/2006 | Campos et al. |
| 7,174,343 | B2 | 2/2007 | Campos et al. |
| 7,590,642 | B2 | 9/2009 | Campos et al. |
| 2006/0136098 | A1 | 6/2006 | Chitrapura et al. |
| 2007/0288475 | A1 | 12/2007 | Shen et al. |
| 2009/0030932 | A1 | 1/2009 | Harik et al. |

OTHER PUBLICATIONS

Mamoulis et al., Efficient Top-k Aggregation of Ranked Inputs, ACM Transactions on Database Systems, vol. 32, No. 3, Article 19 (Aug. 2007).*
Yan et al., Top-K Aggregation Queries Over Large Networks, ICDE Conference 2010 (Mar. 14, 2010).*
Hennessey et al.; A Simplification Algorithm for Visualizing the Structure of Complex Graphs; 1550-6037/08 2008 IEEE; DOI 10.1109/IV.2008.37; pp. 616-625.
Ilyas et al.; A Survey of Top-k Query Processing Techniques in Relational Database Systems; ACM Computing Surveys, vol. 40, No. 4, Article 11, Publication date: Oct. 2008; pp. 11-:58.
Tian et al.; Efficient Aggregation for Graph Summarization; SIGMOD'08, Jun. 9-12, 2008, Vancouver, BC, Canada; copyright 2008 ACM 978-1-60558-102—Jun. 8, 2006;13 pages.
Yiu et al.; Reverse Nearest Neighbors in Large Graphs; IEEE Transactions on Knowledge and Data Engineering; vol. 18. No. 4, Apr. 2006; pp. 540-553.
Gupta et al.; Fast Algorithms for Top-k Personalized PageRank Queries; WWW 2008, Apr. 21-25, 2008, Beijing, China; ACM 978-1-60558-085—Feb. 8, 2004; pp. 1225-1226.
Tian et al.; Efficient Aggregation for Graph Summarization; SIGMOD '08, Jun. 9-12, 2008, Vancouver, BC, Canada; Copyright 2008 ACM 978-1-60558-102—Jun. 8, 2006; 13 pages.
Navlakha et al.; Graph Summarization with Bounded Error; SIGMOD '08, Jun. 9-12, 2008, Vancouver, BC, Canada; copyright 2008 ACM 978-1-60558-102—Jun. 8, 2006; 13 pages.
Bruno et al.; Evaluating Top-k Queries over Web-Accessible Databases; Computer Science Department Columbia University; 12 pages. Jun. 2004.

(Continued)

*Primary Examiner* — Jensen Hu
(74) *Attorney, Agent, or Firm* — Schmeiser, Olsen & Watts

(57) ABSTRACT

A method and system for efficiently answering a local neighborhood aggregation query over graph data. A graph which has a plurality of nodes is received and stored in memory. A local neighborhood aggregation query is received. A processing engine applies forward processing with differential index-based pruning, backward processing using partial distribution, or an enhanced backward processing that combines the backward processing and the forward processing. As a result of the forward, backward, or enhanced backward processing, nodes in the graph that have the top-k highest aggregate values over neighbors within h-hops of the nodes are determined. Identities of entities or persons associated with the determined nodes are presented and/or stored.

17 Claims, 7 Drawing Sheets

OTHER PUBLICATIONS

Li et al.; Supporting Ad-hoc Ranking Aggregates; SIGMOD 2006, Jun. 27-29, 2006,Chicago, Illinois, USA; copyright 2006 ACM 1-59593-256-9/06/0006; 12 pages.

Li et al.; RankSQL: Query Algebra and Optimization for Relational Top-k Queries; SIGMOD Jun. 14-16, 2005 Baltimore, Maryland, USA; copyright 2005 ACM 1-59593-060—Apr. 5, 2006; 12 pages.

Iiyas et al.; Rank-aware Query Optimization; SIGMOD 2004, Jun. 13-18, 2004, Paris, France; copyright 2004 ACM 1-58113-859—Aug. 4, 2006; 12 pages.

Iiyas et al.; Supporting Top-k Join Queries in Relational Databases; Proceeding of the 29th VLDB Conference, Berlin, Germany 2003; 12 pages.

Fagin et al.; Optimal Aggregation Algorithms for Middleware; Journal of Computer and System Sciences 66 (2003) 614-656; pp. 614-656.

Chaudhuri et al.; Evaluating Top-k Selection Queries; Proceedings of the 25th VLDB Conference, Edinburgh, Scotland, 1999; pp. 399-410.

Chang et al.; Minimal Probing: Supporting Expensive Predicates for Top-k Queries; ACM SIGMOD '2002 Jun. 4-6, Madison, Wisconsin, USA; copyright 2002 ACM 1-58113-497—May 2, 2006; 12 pages.

Carey et al.; On Saying "Enough Already!" in SQL; SIGMOD '97 AZ, USA, copyright 1997 ACM 0-89791-911-4/97/0005; pp. 219-230.

* cited by examiner

EFFICIENT COMPUTATION OF TOP-K AGGREGATION OVER GRAPH AND NETWORK DATA

FIELD OF THE INVENTION

The present invention relates to searching and mining large-scale graphs, and more particularly to efficiently answering local aggregation queries over large-scale networks.

BACKGROUND OF THE INVENTION

Managing and mining large-scale networks (e.g., physical, biological, and social networks) is critical to a variety of application domains, ranging from personalized recommendation in social networks, to search for functional associations in biological pathways. Network linkage analysis can find a group of tightly connected people that form a community or discover the centrality of nodes such as hub and authority. Furthermore, advanced analysis of social networks may address very complicated mining tasks, such as evaluating the network value of customers and link prediction. Existing network analytical tools develop application-specific criteria to gauge the importance of nodes or to discover knowledge hidden in complex networks. However, there is a growing need to process standard queries efficiently in large-scale networks. An h-hop query that can be decomposed into an aggregation operation and a top-k operation cannot be answered easily by Structured Query Language (SQL) query engines. Moreover, the performance of using a relational query engine to process h-hop queries is often unacceptable. Thus, there exists a need to overcome at least one of the preceding deficiencies and limitations of the related art.

SUMMARY OF THE INVENTION

In first embodiments, the present invention provides a computer-implemented method of determining a list of k nodes of a graph that have top-k highest aggregate scores over neighboring nodes within h-hops of the k nodes by using forward processing steps. The method comprises:

a computer system obtaining a next node u of the graph, wherein at least one node of the graph is not in a list of pruned nodes;

if the next node u is not in the list of pruned nodes then a processor of the computer system performing the forward processing steps of (a)-(d):

(a) determining an aggregate score of the u by performing an aggregation operation that includes adding an initial score of the u to initial scores of neighboring nodes within h-hops of the u;

(b) if the aggregate score of the u is greater than a lower bound of aggregate scores of the k nodes, then adding the u to the list of k nodes and updating the lower bound of the aggregate scores of the k nodes;

(c) pruning one or more neighboring nodes within h-hops of the u, wherein the pruning is based, in part, on a differential index between a neighboring node of the one or more neighboring nodes and the u and based, in part, on an upper bound of an aggregate score of the neighboring node; and (d) adding the one or more neighboring nodes to the list of pruned nodes; and repeating obtaining the next node and performing the forward processing if the next node is not in the list of pruned nodes until every node of the graph is obtained as the next node by the obtaining.

In second embodiments, the present invention provides a computer-implemented method of determining a list of k nodes of a graph that have top-k highest aggregate scores over neighboring nodes within h-hops of the k nodes by using backward processing steps with a partial distribution and forward processing steps. The method comprises:

a computer system obtaining a next node u of the graph for the partial distribution on a subset of nodes of the graph for which $f(u) \geq \gamma$, wherein the $f(u)$ is an initial score of the u, and wherein the $\gamma$ is a predefined partial distribution threshold;

for each node v within h-hops of the u, a processor of the computer system performing the backward processing steps that include determining an upper bound of an aggregate score of the v;

the computer system repeating obtaining the next node and performing the backward processing until every node of the graph for which $f(u) \geq \gamma$ is obtained as the next node by the obtaining; and subsequently, the computer system performing the forward processing steps that include:

determining an aggregate score of the u by performing an aggregation operation that includes adding an initial score of the u to initial scores of neighboring nodes within h-hops of the u; and if the aggregate score of the u is greater than a lower bound of aggregate scores of the k nodes, then adding the u to the list of k nodes and updating the lower bound of the aggregate scores of the k nodes.

In third embodiments, the present invention provides a computer-implemented method of determining a list of k nodes of a graph that have top-k highest aggregate scores over neighboring nodes within h-hops of the k nodes by using backward processing steps with a partial distribution, a first set of forward processing steps, and a second set of forward processing steps. The method comprises:

a computer system obtaining in a first loop a next node u of the graph for the partial distribution on a subset of nodes of the graph for which $f(u) \geq \gamma$, wherein the $f(u)$ is an initial score of the u, and wherein the $\gamma$ is a predefined partial distribution threshold;

for each node v within h-hops of the u, a processor of the computer system performing the backward processing steps that include determining an upper bound of an aggregate score of the v;

subsequent to performing the backward processing steps, the computer system performing the first set of forward processing steps that include:

determining an aggregate score of the u by performing an aggregation operation that includes adding an initial score of the u to initial scores of neighboring nodes within h-hops of the u;

if the aggregate score of the u is greater than a lower bound of aggregate scores of the k nodes, then adding the u to the list of k nodes and updating the lower bound of the aggregate scores of the k nodes;

pruning one or more neighboring nodes within h-hops of the u, wherein the pruning the one or more neighboring nodes is based, in part, on a differential index between a neighboring node of the one or more neighboring nodes and the u and based, in part, on an upper bound of an aggregate score of the neighboring node; and adding the one or more neighboring nodes to the list of pruned nodes;

repeating obtaining in the first loop, performing the backward processing and performing the first set of forward processing steps until every node of the graph for which $f(u) \geq \gamma$ is obtained as the next node u by the step of obtaining in the first loop;

the computer system obtaining in a second loop a next top node u of the graph from a priority queue Q after determining $f(u) < \gamma$, the next top node u is not in the list of pruned nodes, and an upper bound of the aggregate score of the next top node u is greater than the lower bound of the aggregate scores of the k nodes;

in response to determining the next top node u is not in the list of pruned nodes, the computer system performing the second set of forward processing steps of:

determining the aggregate score of the next top node u;

if the aggregate score of the next top node u is greater than a lower bound of the aggregate scores of the k nodes, then adding the next top node u to the list of k nodes and updating the lower bound of the aggregate scores of the k nodes;

pruning a second one or more neighboring nodes within h-hops of the next top node u, wherein the pruning the second one or more neighboring nodes is based, in part, on a differential index between a second neighboring node of the second one or more neighboring nodes and the next top node u and based, in part, on an upper bound of an aggregate score of the second neighboring node; and adding the second one or more neighboring nodes to the list of pruned nodes; and repeating obtaining the next top node and performing the second set of forward processing until every node of the graph is processed by the step of obtaining the next top node.

Systems and program products corresponding to the above-summarized methods are also described and claimed herein.

Embodiments of the present invention provide efficient techniques using forward processing with a differential index and/or backward processing with partial distribution to find nodes of a graph that have top-k aggregate values over their neighbors within h-hops.

DETAILED DESCRIPTION OF THE INVENTION

1. Overview

Figure 1:
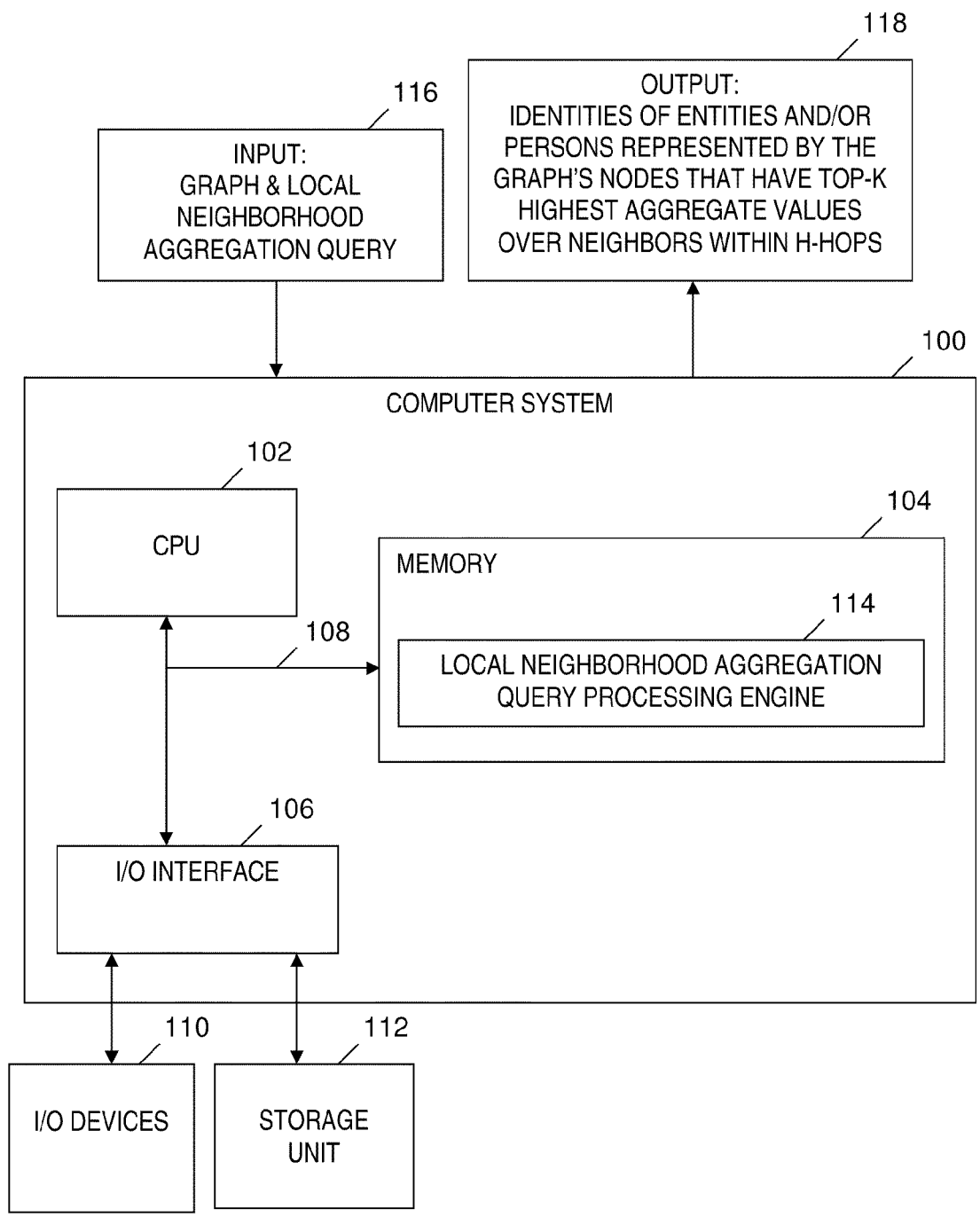
FIG. 1 is a block diagram of a system for answering local neighborhood aggregation queries, in accordance with embodiments of the present invention.

One embodiment of the present invention provides an efficient neighborhood aggregation query that finds nodes in a network that have the top-k highest aggregate values over the nodes' neighbors within h-hops. A Local Neighborhood Aggregation (LONA) framework is disclosed herein that answers these queries efficiently. LONA exploits two properties unique in network space: (1) in most cases, the aggregate values for the neighboring nodes are similar; and (2) given the distribution of attribute values, it is possible to estimate the average value of aggregates, which is likely less than top-k values. Two novel pruning techniques disclosed herein are based on the two aforementioned properties: (1) forward pruning using a differential index; and (2) backward pruning using partial distribution. The differential index is related to the proximity of nodes in a graph, while the partial distribution is motivated by aggregate distribution over graph substructures. Hereinafter, forward pruning using a differential index is also referred to as "forward processing with differential index-based pruning" or "pruning-based forward processing." Hereinafter, backward pruning using partial distribution is also referred to as "backward processing using partial distribution."

Aggregate values for the neighboring nodes in a network are likely similar to each other in many cases. Given a node u, if the upper bound of u and its neighbors is less than the top-k values discovered so far, one may prune u's neighbors without calculating the neighbor's real aggregate values. The question resolved by the present invention is how to compute the upper bound of neighbor nodes and determine when such an upper bound becomes tight and is able to prune a substantial number of nodes. The technique for resolving this question is referred to herein as forward pruning by aggregation proximity or simply as forward pruning. Many star-structures exhibit strong (sub)similarity so that if the central node is pruned, the surrounding nodes can be pruned. In order to realize this property, a differential index is disclosed herein. This differential index is invariant to queries, and is therefore reusable.

While the differential index needs to be pre-computed and stored, an embodiment of the present invention provides a technique that does not require any pre-computation. An estimation of the distribution of aggregation values over a sample of nodes indicates that if the majority of insignificant scores are removed, the relative order of top-k values will not change, which is equivalent to counting only the most significant scores and using this partial aggregation to prune most nodes. This observation is the basis of backward pruning using partial distribution (a.k.a. Backward pruning by partial distribution or simply backward pruning), which is disclosed herein. The forward pruning and backward pruning methods are complementary to each other and fit queries with varied characteristics.

Examples of queries that can be answered by the LONA framework include: (1) for each node, find the aggregate value of an attribute for the node's neighbors within h-hops and (2) find the link density in a neighborhood of a node. The above-listed query (1) may identify, for instance, the popularity of a game console in one's social circle, or the number of times a gene is co-expressed with a group of known genes in co-expression networks. The above-listed query (2) may determine, for instance, if a social group surrounding a person is tightly connected or not. As another example, suppose social networks are to be used to identify potential buyers who are interested in XYZ video game console offered by ABC company. The potential buyers are identified, for example, by submitting the following query: "Find persons having the largest number of friends who recently played or discussed XYZ games." This query may be decomposed into two operations: an aggregation operation to sum up the interests of 1-hop or 2-hop friends and a top-k operation to select the nodes with the highest aggregate values. Aggregation operators are basic operators used to summarize or aggregate nodes or a substructure of a graph. An aggregation operator may be a SQL aggregate function as simple as SUM or AVG, or as complicated as a non-linear function learned by a collective classification method.

FIG. 1 is a block diagram of a system for answering local neighborhood aggregation queries, in accordance with embodiments of the present invention. A computer system 100 may include a central processing unit 102, a memory 104, an input/output (I/O) interface 106, and a bus 108. Computer system 100 may be coupled to one or more I/O devices 110 and a computer data storage unit 112. A software-based local neighborhood aggregation query processing engine 114 is included as program code in memory 104. Components 100, 102, 104, 106, 108, 110, and 112 are described further in the section entitled Computer System, which is presented below. Computer system 100 receives input 116, which includes data representing a graph that includes a plurality of nodes and edges. Input 116 also includes a local neighborhood aggregation query that finds the nodes in the graph included in input 116 that have the top-k highest aggregate values over the nodes' neighbors within h-hops. Local neighborhood aggregation query engine 114 is run by computer system 100 to process the local neighborhood aggregation query included in input 116 and to generate output 118. Output 118 includes the identities of persons and/or entities, where the persons and/or entities are associated with the nodes in the inputted graph that have the top-k highest aggregate values over the nodes' neighbors within h-hops.

For the embodiments disclosed herein, the entire graph included in input 116 is stored and fits in main memory 104 of computer system 100, as having the entire graph on disk would not be practical in terms of graph traversal. In one embodiment, the inputted graph is stored as a text file that specifies all the nodes and edges, including the nodes' attributes and relationships.

Figure 2:
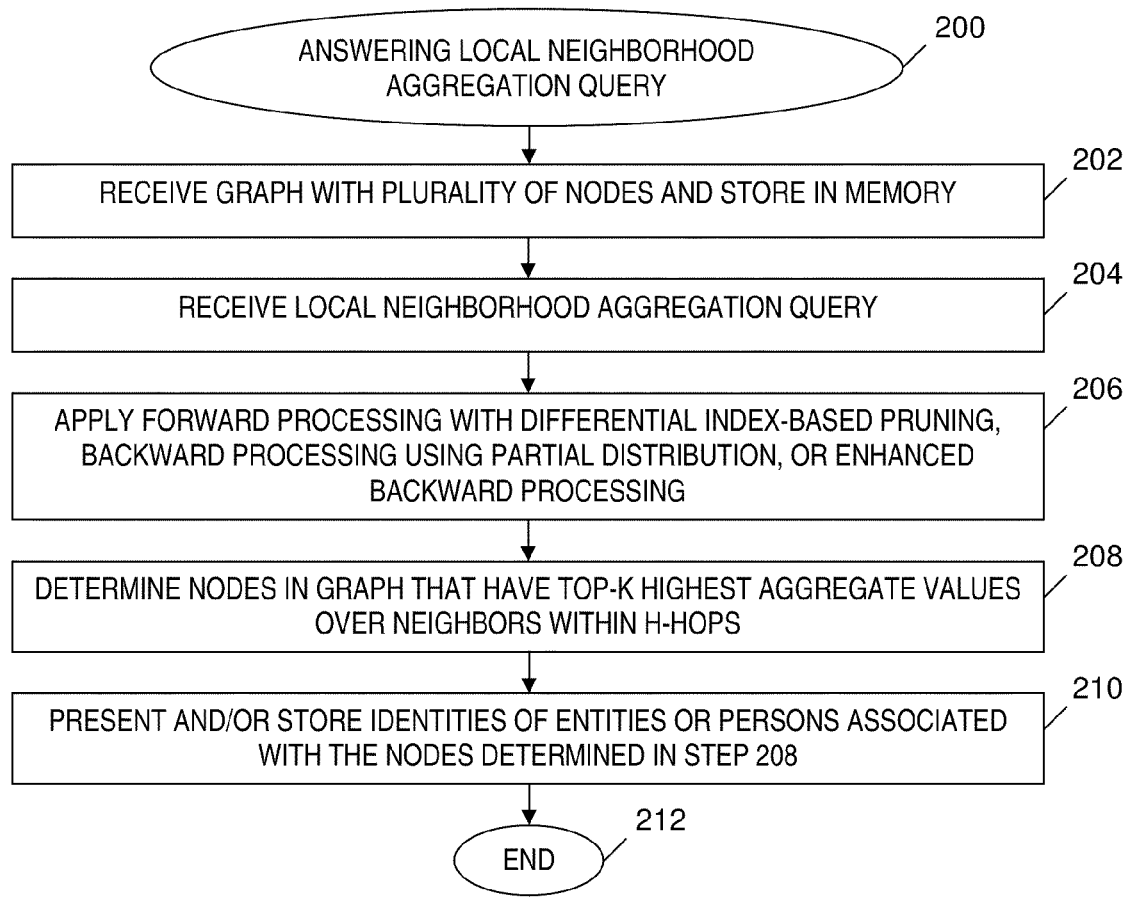
FIG. 2 is a flowchart of a process for answering local neighborhood aggregation queries in the system of FIG. 1, in accordance with embodiments of the present invention.

FIG. 2 is a flowchart of a process for answering local neighborhood aggregation queries in the system of FIG. 1, in accordance with embodiments of the present invention. In one embodiment, the steps of the process of FIG. 2 are performed by local neighborhood aggregation query processing engine 114 (see FIG. 1). The process of FIG. 2 begins at step 200. In step 202, computer system 100 (see FIG. 1) receives a graph having a plurality of nodes and edges and the computer system stores the received graph in memory 104 (see FIG. 1). Nodes of the graph received in step 202 are associated with entities or persons in a one-to-one correspondence.

In step 204, computer system 100 (see FIG. 1) receives a local neighborhood aggregation query to find the top-k highest aggregate values over the nodes' neighbors within h-hops.

In step 206, computer system 100 runs processing engine 114 (see FIG. 1) to implement forward processing with differential index-based pruning, backward processing using partial distribution, or enhanced backward processing to answer the query received in step 204.

In step 208, computer system 100 determines the nodes in the graph received in step 202 that have the top-k highest aggregate values over the nodes' neighbors within h-hops.

In step 210, computer system 100 presents (e.g., displays) and/or stores in storage unit 112 (see FIG. 1) the identities of the corresponding entities or corresponding persons associated with the nodes determined in step 208. The process of FIG. 2 ends at step 212.

Embodiments of the present invention provide pruning-based techniques for determining a graph's nodes that have top-k highest aggregate values over the nodes' neighbors within h-hops, where determining the nodes is done via a top-k query on a single source with graph data and where the entire graph fits in to the main memory of a computer system.

2. Problem Formulations

In social networks, nodes represent people while edges represent social relations between the people. In the embodiments disclosed herein, a general attributed graph model is adopted, where nodes have associated attributes and edges indicate a connection between nodes. Formally, a graph G is denoted as (V, E), where V is the set of nodes, and E is the set of edges. To provide simplification, it is assumed herein that the graphs are undirected connected graphs that have neither loop nor multiple edges.

A graph has a node attribute set, denoted as A={$a_1$, $a_2$, ..., $a_r$}. Each node has a value for each attribute in the node attribute set. These attributes are used to describe various features and aspects of the entities or persons that the nodes represent. For example, a node representing a user of a social networking website may have attributes showing if he/she is interested in online role-playing games. As another example, each node of a graph may represent a professional using a professional networking website and the linkage between nodes indicates a reference between two professionals. As an example in communication networks, intrusion packets may formulate a large, dynamic intrusion network, where each node corresponds to an Internet Protocol (IP) address and there is an edge between two IP addresses if an intrusion attack takes place between them.

Example 1 described below presents an example of neighbor aggregation queries.

Example 1

An online professional networking tool helps people discover inside connections to recommended job candidates, industry experts and business partners. It is natural to submit queries for business companies to find top-k candidates who have strong expertise and are referred by professionals in the same domain. For example, a query may find top-k candidates who have experiences in database research and also are referred by many database experts.

There is no doubt that the above queries are useful for emerging applications in many online social communities and other networks, such as book recommendations on a website of an online retailer, targeted marketing on a social networking website, and gene function finding in biological networks. These applications are unified by a general aggregation query definition over a network. In general, a top-k aggregation on graphs needs to solve three problems, listed below as P1, P2 and P3. Note that P1, P2 and P3 are listed below for problem clarification, and do not imply any algorithm implementations:

P1. Evaluate the individual strength of a node for a given query as $f(u)$. $f(u)$ may be as simple as 1/0 (i.e., a function that returns 1 or 0). For example, $f(u)$ may indicate 1 if a user recommends a movie or 0 if the user does not recommend the movie. $f(u)$ may also be a classification function that indicates, for example, how likely a user is a database expert.

P2. Evaluate the collective strength of a node as $F(u)$. $F(u)$ is an aggregate function (a.k.a. aggregation function) over $f(v_1), f(v_2), \ldots, f(v_m)$, where $v_1, v_2, \ldots, v_m$ are u's neighbors within h-hops. $F(u)$ may be a simple aggregation function, such as SUM, $f(v_1)+f(v_2)+ \ldots +f(v_m)$, or AVG, $(f(v_1)+f(v_2)+ \ldots +f(v_m))/m$. $F(u)$ may be as complicated as a non-linear function (e.g., a non-linear function learned by a collective classification method). Edge weights may be introduced so that $F(u)$ is $w(u,v_1)f(v_1)+w(u,v_2)f(v_2)+ \ldots + w(u,v_m)f(v_m)$, where $w(u,v)$ measures connection strength between u and v (e.g., the inverse of the shortest distance between u and v).

P3. Find top-k nodes having the highest scores (i.e., the highest aggregate values as determined by $F(u)$).

Definitions 1, 2 and 3 presented below formally define the problems P1, P2 and P3, respectively.

DEFINITION 1 (Relevance Function). Given a network G, a relevance function $f: V \to [0, 1]$ assigns a score [0,1] to each node in G. The relevance function $f$ assigns a score of 0 if the node is not relevant to the query and assigns a score of 1 if the node has full relevance to the query. In one embodiment, the relevance function is provided to processing engine 114 (see FIG. 1) on the fly, and varies dramatically according to different queries.

DEFINITION 2 (Neighborhood Aggregate). Given a network G and a relevance function $f: V \to R$, a sum aggregation of h-hop neighbors is defined as $F(u) = \Sigma_{v \in S_h(u)} f(v)$. An average aggregation of h-hop neighbors is defined as $$(u) = \frac{\sum v \in S_h(u) f(v)}{|S_h(u)|},$$

where $S_h(u)$ is the set of u's neighbors within h-hops.

DEFINITION 3 (Top-k Neighborhood Aggregates). Given a network G, a relevance function $f$, and a neighborhood aggregation function F, find k nodes in V(G) whose neighbors generate the highest aggregate score over F.

As functions $f$ and F are often learned in a process, for a large network, it may be expensive to perform aggregations over the entire network for various kinds of queries. Assuming on average that each node has m 1-hop neighbors, in order to evaluate the collective strength of all the nodes, the number of edges to be accessed is approximately $m^h|V|$ for h-hop queries. This computational cost is not affordable in applications involving large-scale networks and heavy query workloads.

In one or more embodiments, a solution to the problem formulated in Definitions 1, 2 and 3 is presented herein using the two basic aggregation functions SUM and AVG. However, it will be apparent to those skilled in the art that the present invention may be extended to other, more complicated aggregation functions.

3. Forward Processing

A first forward processing approach to answer top-k neighborhood aggregation queries is to check each node in the network, find each node's h-hop neighbors, aggregate the values (i.e., scores) of the each node and its h-hop neighbors together, and then choose the k nodes with the highest aggregate values.

Example 2

Figure 3A:
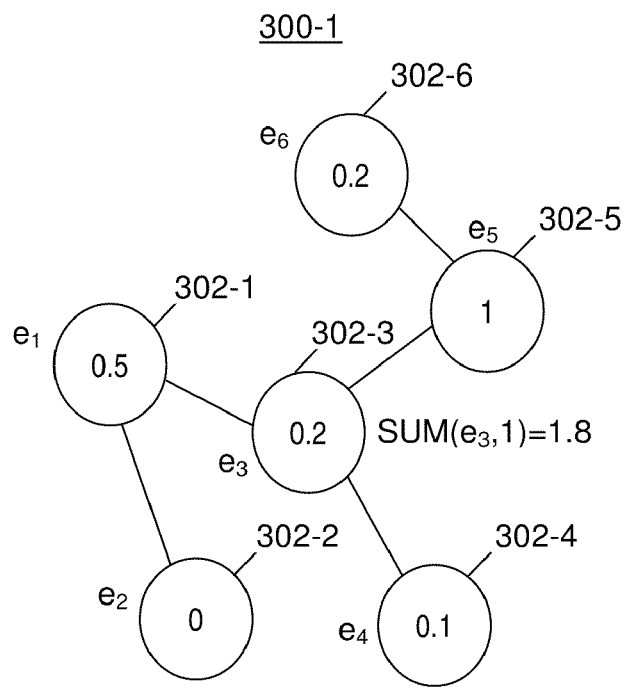
FIGS. 3A-3B depict nodes of a graph for which an example of forward processing is applied to an aggregation query, in accordance with embodiments of the present invention.
Figure 3B:
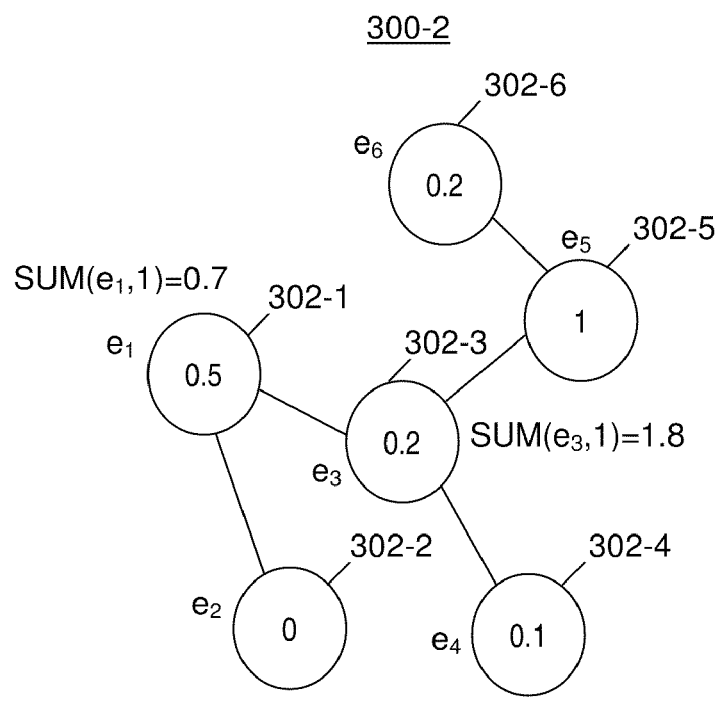

FIG. 3A and FIG. 3B illustrate an example of the first forward processing approach. Given a graph 300-1 shown in FIG. 3A with nodes 302-1, 302-2, 302-3, 302-4, 302-5 and 302-6 (a.k.a. nodes $e_1, e_2, e_3, e_4, e_5$ and $e_6$, respectively), the SUM function for 1-hop neighbors is computed to generate aggregate scores (a.k.a. aggregate values). Node $e_3$ is selected first for a forward processing and $SUM(e_3,1)$ is computed as 1.8 (i.e., the aggregate score of $e_3$).

In the SUM function in FIGS. 3A and 3B and in the examples that are presented below, the "1" parameter (e.g., the "1" in $SUM(e_3,1)$) indicates 1-hop. Thus, in Example 2, $SUM(e_3,1)$ is the sum of the score assigned to node $e_3$ plus the scores assigned to the 1-hop neighbors of node $e_3$ (i.e., score of node $e_3$+score of node $e_1$+score of node $e_2$+score of node $e_4$+score of node $e_5$, or 0.2+0.5+0+0.1+1=1.8).

In Example 2, node $e_1$ is selected as the next node and $SUM(e_1, 1)$ is computed as 0.5+0+0.2=0.7. Thus, the aggregate score of node $e_1$ is 0.7. The selection of $e_1$ and the computation of $SUM(e_1, 1)=0.7$ is shown in graph 300-2 in FIG. 3B. Graph 300-2 includes the same nodes (i.e., nodes 102-1, 102-2, 102-3, 102-4, 102-5 and 102-6) as graph 300-1 in FIG. 3A. The process of selecting a next node and using the SUM function to compute the aggregate score of the next node as shown in FIGS. 3A-3B is continued until the aggregate scores for all the nodes $e_1, e_2, e_3, e_4, e_5$ and $e_6$ are evaluated. After the aggregate scores for all the nodes are evaluated, the top-k nodes are selected (i.e., the nodes having the top-k aggregate scores are selected).

Algorithm 1 outlines the first forward processing approach. In one embodiment, the steps of algorithm 1 are performed by local neighborhood aggregation query processing engine 114 (see FIG. 1). The forward processing is performed in line 3 of Algorithm 1. Lines 4-6 of Algorithm 1 check whether the new node is so far a top-k candidate by checking whether $F(u)$ is greater than the lower bound of the top-k candidates (i.e., $F(u)$ is greater than topklbound, the lowest aggregate score among the aggregate scores of k candidate nodes stored in topklist). Algorithm 1 returns topklist as a list of k nodes that have the top-k highest aggregate scores over neighboring nodes within h-hops of the k nodes. Other algorithms presented below also use topklbound to be the lowest aggregate score among aggregate scores of top-k candidates and return topklist as the list of k nodes that have the top-k highest aggregate scores over neighboring nodes within h-hops of the k nodes. The time complexity of this first forward processing algorithm is O(E) for 1-hop neighbors and O(dE) for 2-hop neighbors, where d is the average degree of a node. While this first forward processing approach is affordable for small-size networks, it is not efficient for a large network because it has to scan the h-hop nodes for every node in the network.

---

Algorithm 1 - First Forward Processing:

ForwardFirst (G)
Output: Top k (node, aggr_value) pairs
1: topklist ={ }, topklbound = 0
2: for each node u in G do
3:    $F(u)$ = u's aggregate value in h-hops
4:    if $F(u)$ > topklbound then
5:        update topklist with (u, $F(u)$)
6:        update topklbound
7:    end if
8: end for
9: return topklist

---

Pruning-based forward processing techniques presented below improve the first forward processing approach by avoiding the need to conduct forward aggregation on every node. The idea is to prune unprocessed nodes based on processed ones. Algorithm 2 includes LONA-Forward, a high-level procedure for pruning-based forward processing. In one embodiment, the steps of Algorithm 2 are performed by local neighborhood aggregation query processing engine 114 (see FIG. 1).

Algorithm 2 - Pruning-based Forward Processing:

LO NA-Forward (G)
Output: Top k (node, aggr_value) pairs
1: Add G's nodes into a priority queue Q
2: topklist ={ }, topklbound = 0, prunedlist={ }
3: while Q is not empty do
4:   u = get the top node in Q
5:   if u not in prunedlist then
6:     F(u) = u's aggregate value in h-hops
7:     if F(u) > topklbound then
8:       update topklist with (u, F(u))
9:       update topklbound
10:    end if
11:    pnodes = pruneNodes(u, F(u), G, topklbound)
12:    add nodes from pnodes into prunedlist
13:  end if
14: end while
15: return topklist Algorithm 2 shares a similar procedure to the first forward processing algorithm, but includes two major differences in line 11 and line 1. Line 11 of Algorithm 2 finds new nodes that can be pruned, thereby avoiding forward processing in later iterations. Line 1 of Algorithm 2 sorts nodes according to a particular order to make sure that nodes with high pruning capabilities are processed first.

The remaining part of this section addresses the following items, which determine the performance of Algorithm 2:

(1) Designing an efficient and effective pruning algorithm, pruneNodes (see section 3.1 Differential Index)
(2) Determining the order to be used for the priority queue Q (see section 3.2 Ordering Nodes)

3.1 Differential Index

A bounding strategy of F(u) without accessing its neighbors is to pre-compute the number of its h-hop neighbors, written N(u). For the SUM aggregate, $F_{sum}(u) \leq N(u)$. Unfortunately, N(u) is not tight since it assumes all the neighbor nodes have a relevance score of "1". This bounding technique is not useful for the AVG function. Since existing bounding techniques available for spatial and time-series data do not work for unstructured, non-Euclidean data like graphs, the present invention exploits unique properties in graph space.

Although a tight bound cannot be derived for an individual node using the bounding strategy described above, it is possible to derive a differential bound (i.e., a differential index) between a pair of nodes if they are connected. Intuitively, if one node has a low aggregate value, it is very likely the node's neighbors have low values, and therefore can be pruned.

Given a node u in a graph, let S(u) denote the set of distinct nodes in u's h-hop neighborhood. For every node u, and any of its neighbor nodes v, a differential index tells the number of nodes in S(v), but not in S(u), denoted delta(v−u)=|S(v)\S(u)|.

To use the differential index for node pruning, conduct a forward processing of a node u and denote its h-hop aggregate value as F(u). Then compute the upper bound of the aggregate value of any u's neighbor node v. For SUM aggregates, derive $$\overline{F}_{sum}(v) = \min(F(u) + \text{delta}(v-u), N(v) - 1 + f(v)) \quad (1)$$

$\overline{F}(v)$ is used to denote the upper bound value of F(v). Given a node v, its possible upper bound is $N(v)-1+f(v)$ (i.e., node v itself has a score $f(v)$ and all the other nodes in its h-hops have a score of 1). Given F(u) and delta(v−u), one can derive that F(v) will be at most F(u)+delta(v−u) (i.e., S(v) contains all of u's nodes that have values and have a score of 1 for all the nodes that are not in S(u)). Therefore, the smaller one of F(u)+delta(v−u) and N(v)−1+$f(v)$ is taken as the upper bound of F(v). Section 4 presented below will show how to lower this bound further by partially distributing the highest relevance scores. Actually, the upper bound of F(v) is the minimum value of the bounds derived from v's friends. That is, $$\overline{F}_{sum}(v) = \min_{u \in S(v)} \{F(u) + \text{delta}(v-u), N(v)-1+f(v)\}.$$

The upper bound of AVG aggregates is derived by simply dividing the $\overline{F}_{sum}(v)$ value by the number of nodes v's h-hops, i.e., $$\overline{F}_{avg}(v) = \frac{\overline{F}_{sum}(v)}{N(v)} \quad (2)$$

For the forward pruning, the differential index is built for all the edges in a graph.

Figure 4:
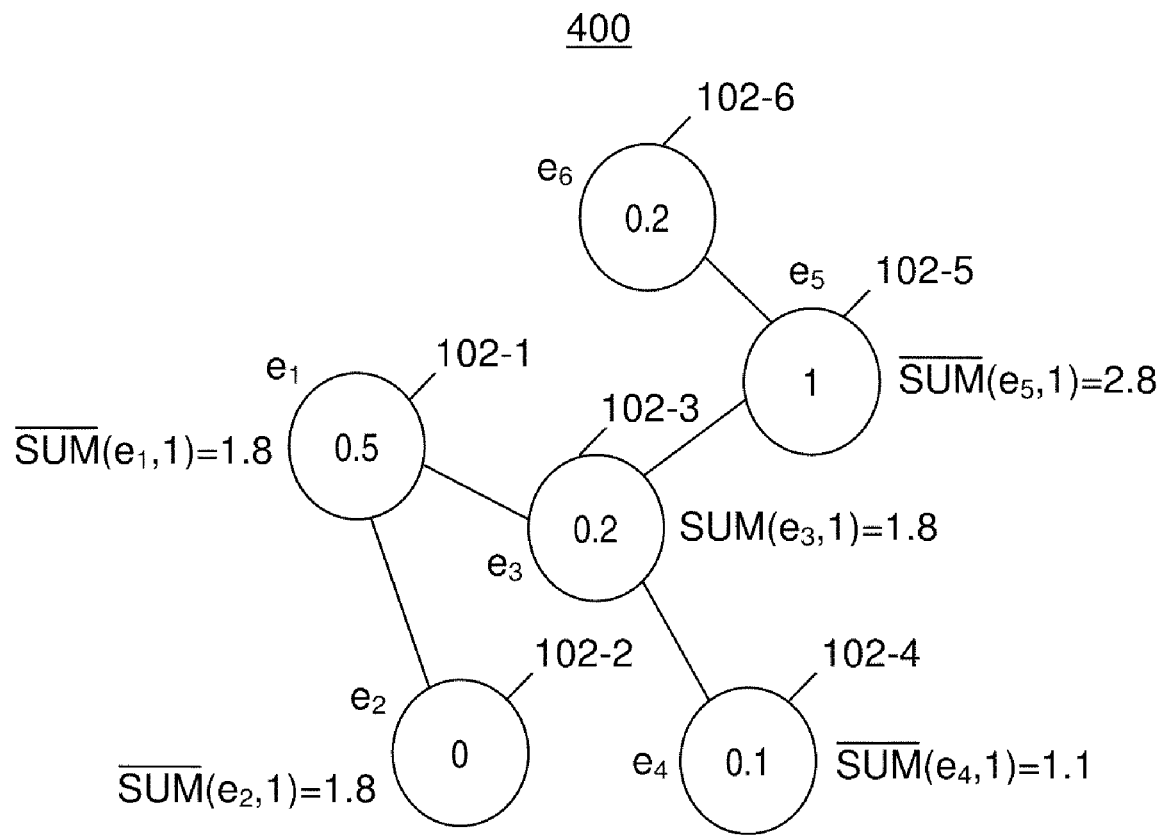
FIG. 4 depicts nodes of a graph for which an example of forward processing using differential index-based pruning is applied to a local neighborhood aggregation query, where the forward processing is included in the process of FIG. 2, in accordance with embodiments of the present invention.

FIG. 4 depicts nodes of a graph for which an example of forward processing using differential index-based pruning is applied to a local neighborhood aggregation query, where the forward processing is included in the process of FIG. 2, in accordance with embodiments of the present invention. FIG. 4 includes a graph 400 that includes the same nodes 102-1, 102-2, 102-3, 102-4, 102-5 and 102-6 that are included in FIGS. 3A-3B.

Example 3

Consider graph 400 in FIG. 4, which depicts an example of forward processing using differentia index-based pruning. For node $e_3$, the differential indexes of its neighbors in 1-hop are: delta($e_1-e_3$)=0, delta($e_2-e_3$)=0, delta($e_4-e_3$)=0, and delta($e_5-e_3$)=1. The differential index values for delta($e_1-e_3$), delta($e_2-e_3$), and delta($e_4-e_3$) are zero because $e_1$, $e_2$ and $e_4$'s 1-hop nodes are a subset of $e_3$'s 1-hop nodes. The differential index value for delta($e_5-e_3$) is 1 because $e_5$ has one node that is in its 1-hop but not in $e_3$'s 1-hop (i.e., node $e_6$).

In Example 3, a forward processing is done on node $e_3$ with the SUM aggregate values evaluated on node $e_3$'s 1-hop nodes to obtain SUM($e_3$,1)=1.8. Then the upper bound of $e_3$'s neighbor nodes is computed, as FIG. 4 shows. For instance, $\overline{SUM}(e_1,1)$=1.8 because given delta($e_1-e_3$)=0, the aggregate value of node $e_1$ can at most be the same as SUM($e_3$,1). $\overline{SUM}(e_4, 1)$=1.1 because node $e_4$'s own score is 0.1 and node $e_4$ has only one neighbor. Thus, $N(e_4)-1+f(e_4)$ becomes a better bound for $e_4$ than using the differential index.

After performing a forward processing on node u, for any u's neighbor node v that satisfies $\overline{F}(v) \leq$ topklbound, v is pruned and put into the pruned node list (i.e., prunedlist in Algorithm 2). Algorithm 3 outlines the pruneNodes function called in line 11 of Algorithm 2. In one embodiment, the steps of Algorithm 3 are performed by local neighborhood aggregation query processing engine 114 (see FIG. 1). The pruning strategy included in Algorithm 3 is efficient to carry out. Equation 1 involves two pre-computed values (i.e., delta(v−u) and N(v)); thus, checking whether a node can be pruned or not is a fast process. This pruning strategy is effective especially when node u has a low aggregate value (i.e., F(u) is low according to predefined criteria) and node u's neighbor v substantially overlaps with u (i.e., delta(v−u) is low according to predefined criteria).

```
Algorithm 3-Differential index-based pruning pruneNodes (Node u, F(u), G, topklbound)
Output: prunednodes
1:      prunednodes = { }
2:      for each u's neighbor node v do
3:          if SUM function then
4:              F̄(v) = min (F(u) + delta(v − u), N(v) − 1 + f(v))
5:          else if AVG function then
6:              F̄(v) =  min (F(u) + delta(v − u), N(v) − 1 + f(v))
                        ─────────────────────────────────────────────
                                              N(v)
7:          end if
8:          if F̄(v) ≤ topklbound then
9:              add v into prunednodes
10:         end if
11:     end for
12:     return prunednodes
```

The differential index adopted by the forward processing performed by Algorithms 2 and 3 needs to be pre-computed and stored in memory 104 (see FIG. 1). While the forward processing that uses differential index-based pruning is more advanced than the first forward processing approach, a pruning technique that does not need any pre-computed index would be advantageous. Section 4 introduces pruning techniques that avoid the need for a pre-computed index.

3.2 Ordering Nodes

The performance of pruneNodes at a given point in Algorithm 3 not only relies on a tight upper bound of F(u) for each node u accessed, it is also related to the least top-k value (i.e., topklbound) found up to that point in Algorithm 3. The pruning in Algorithm 3 takes place in response to determining that F̄(v)≤topklbound (see Algorithm 3, line 8). Ideally, nodes are to be searched according to their potential pruning capabilities, and therefore the nodes are put into a priority queue (see Algorithm 2, line 1). Unfortunately, such information is very sensitive to each query and the graph structure, and is therefore difficult to obtain.

For SUM aggregates, it is observed that ordering nodes according to the number of their neighbors N(u) has the following benefits: (1) Nodes with large N(u) values often have high aggregate values, and therefore may achieve good pruning performance; and (2) N(u) is pre-computed and used in the differential index, and therefore no new pre-computation is needed. Thus, in one embodiment, N(u) is used to order nodes in the priority queue of Algorithm 2. In Section 4, it will be shown that using partial distribution in backward processing provides an advantageous alternative for node ordering.

4. Backward Processing

In forward processing techniques discussed above, the aggregate value is directly computed for each node in a graph. However, this is not the only way to compute aggregate values. An alternative is to apply a backward distribution method. For each node u, rather than aggregating the scores of node u's neighbors, the backward distribution process sends node u's score to all of node u's neighbor nodes. In response to all the scores being sent by the backward distribution process, the aggregate value of all the nodes is calculated and then the top-k nodes are selected.

Figure 5A:
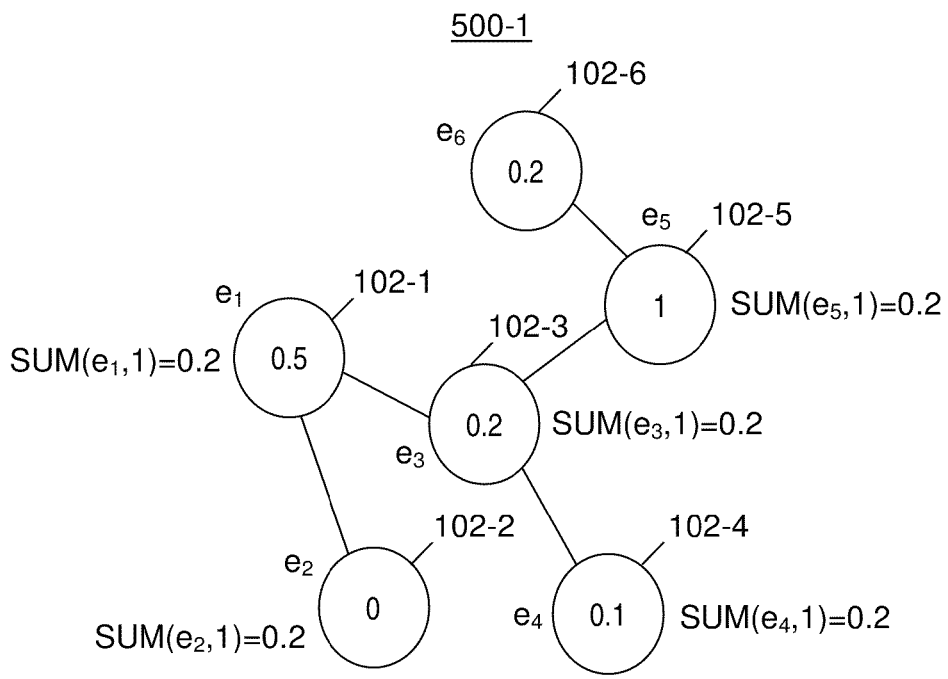
FIGS. 5A-5B depict nodes of a graph for which an example of backward processing is applied to a local neighborhood aggregation query, in accordance with embodiments of the present invention.
Figure 5B:
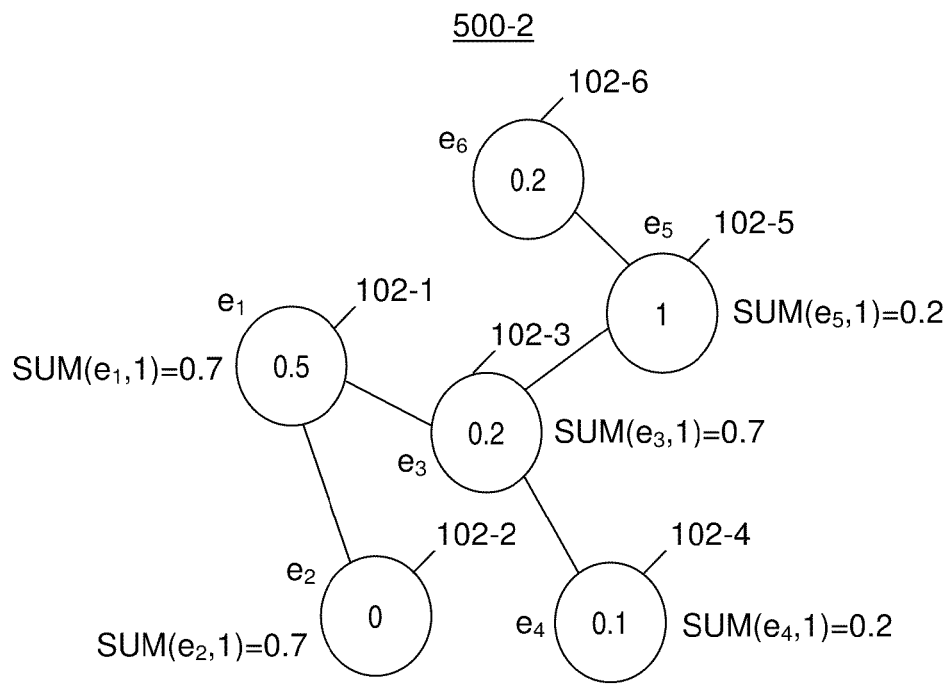

FIGS. 5A-5B depict nodes of a graph for which an example of backward processing is applied to a local neighborhood aggregation query, in accordance with embodiments of the present invention. FIGS. 5A and 5B include graphs 500-1 and 500-2, respectively. Each of the graphs 500-1 and 500-2 comprises the same nodes 102-1, 102-2, 102-3, 102-4, 102-5 and 102-6 that are included in FIGS. 3A-3B and FIG. 4.

Example 4

For instance, in graph 500-1 in FIG. 5A, node $e_3$ is taken first for backward processing. Node $e_3$'s score of 0.2 is added to all the nodes in node $e_3$'s 1-hop (i.e., $e_1$, $e_2$, $e_3$, $e_4$, and $e_5$). Then, as shown in FIG. 5B, node $e_1$ is selected for backward processing and node $e_1$'s score of 0.5 is added to nodes in node $e_1$'s 1-hop (i.e., $e_1$, $e_2$, and $e_3$). This backward processing continues with the other nodes and stops after the scores of all the nodes are backward distributed.

As the backward processing has to wait until all of nodes are backward distributed, its cost is equal to the first forward processing approach. However, one exception is when the relevance function is 0-1 binary (i.e., the relevance function returns only a 0 value or a 1 value). In the case of a 0-1 binary relevance function, the backward processing may skip nodes with a 0 score, since these nodes having a score of 0 have no contribution to the aggregate values. In a case in which the majority of nodes have a score of 0, only a relatively small number of non-zero nodes needs to be distributed using the backward processing strategy, thereby significantly reducing the time needed for executing the query. There are many application scenarios where the relevance function selects a small set of relevant nodes and treat the remaining as zero. For example, find top-k nodes with the largest number of friends who recommended hardware device XYZ. In the example in this paragraph, the relevance function is a selection statement that selects nodes that recommend the hardware device XYZ. Since the pool of such nodes is relatively small, the backward processing approach can speed up the top-k search dramatically. Algorithm 4 outlines the main idea of this backward distribution method. In one embodiment, the steps of Algorithm 4 are performed by local neighborhood aggregation query processing engine 114 (see FIG. 1).

```
Algorithm 4-First Backward Processing

BackwardFirst (G)
Output: Top k (node, aggr_value) pairs
1:      for each non-zero node u in G do
2:          for each node v in u's h-hops do
3:              F_sum(v) = F_sum(v) + f(u)
4:          end for
5:      end for
6:      if SUM function then
7:          topklist = pick k nodes with the highest F_sum(u) values.
8:      else if AVG function then
9:          topklist = pick k nodes with the highest  F_sum(u)
                                                     ─────── values.
                                                      N(u)
10:     end if
11:     return topklist
```

Unfortunately, it is difficult to apply the pruning strategy described above for non-zero nodes in backward processing. A node cannot be skipped as long as it may contribute its score to a top-k node, which is unknown unless all non-zero nodes are distributed.

Comparing forward processing and backward processing strategies, it is observed that both strategies have some advantages and disadvantages. On the one hand, when most nodes have a score of 0, backward processing is faster than forward processing. In an extreme situation when there is only one node having a non-0 score, only this one node needs to be processed using the backward processing distribution strategy. However, in forward processing, many nodes may have to be processed. On the other hand, when most nodes have non-0 scores, it is more efficient to use forward processing. In the case of most nodes having non-0 scores, backward processing has to distribute all the nodes with non-zero scores and thus becomes very inefficient. The remaining portion of Section 4 discusses how to combine the backward and forward processing strategies.

4.1 Partial Distribution

To leverage the advantages of both the forward and backward processing strategies, a hybrid processing strategy with partial backward distribution is disclosed herein. The forward processing can be used together with the backward processing method if one chooses not to distribute all of the nodes' scores in one batch.

In particular, nodes are distributed according to their scores in a descending order. In this descending order, when backward processing of a node u is done, the upper bound of the aggregate value for u's h-hop neighbors may be computed as described below.

Given a node v, suppose it has been scanned by l nodes $u_1, \ldots, u_l$ using backward processing, and $u_l$ is the latest one. That is, $f(u_l)$ is the lowest one among $f(u_1), \ldots, f(u_l)$. For the SUM function, if v is not one of the l nodes, $F_{sum}(v)$'s upper bound can be computed as:

$$\overline{F}_{sum}(v) = \Sigma_{i=1}^{l} f(u_i) + f(v) + f(u_l)*(N(v)-l-1) \quad (3)$$

Equation 3 is valid for the above-mentioned case when v is not one of the l nodes because v has N(v) neighbors (including v itself), among which l neighbors' scores are known and N(v)−l−1 neighbors' scores are unknown. Since the score is distributed in a descending order, N(v)−l−1 neighbors are bound using the lowest one that has been distributed, i.e., $f(u_l)$. Similarly, if v is among these/nodes, F(v)'s upper bound is:

$$\overline{F}_{sum}(v) = \Sigma_{i=1}^{l} f(e_i) + f(e_l)*(N(v)-l) \quad (4)$$

The upper bound for the AVG function is still $$\overline{F}_{avg}(v) = \frac{\overline{F}_{sum}(v)}{N(v)},$$

but this time, $\overline{F}_{sum}(v)$ is defined using Equations 3 and 4.

Figure 6A:
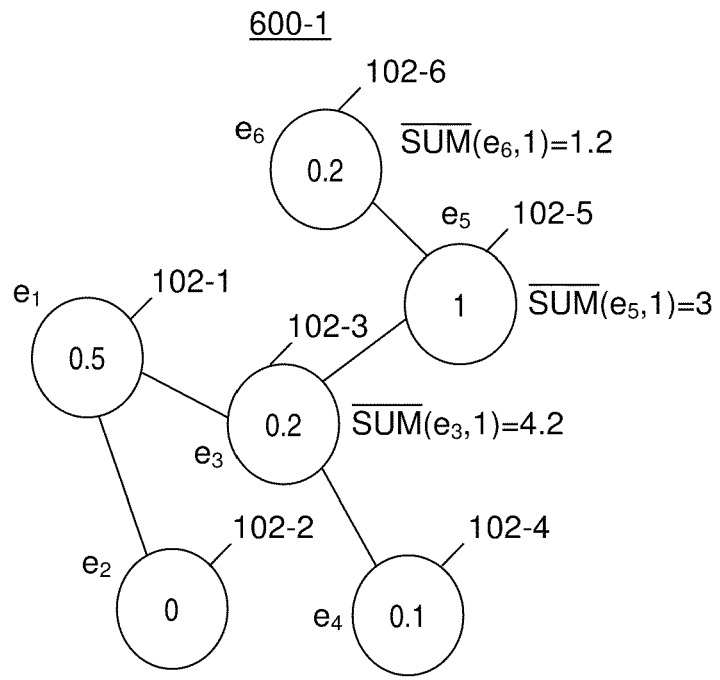
FIGS. 6A-6B depict nodes of a graph for which an example of backward processing using partial distribution is applied to a local neighborhood aggregation query, where the backward processing is included in the process of FIG. 2, in accordance with embodiments of the present invention.
Figure 6B:
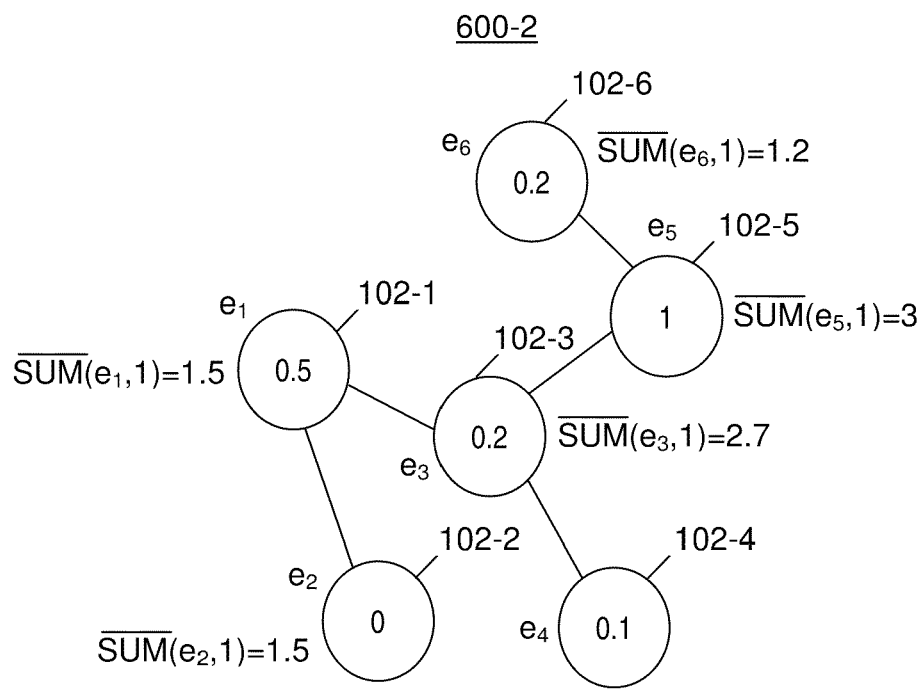

FIGS. 6A-6B depict nodes of a graph for which an example of backward processing using partial distribution is applied to a local neighborhood aggregation query, where the backward processing is included in the process of FIG. 2, in accordance with embodiments of the present invention. FIG. 6A and FIG. 6B include graphs 600-1 and 600-2, respectively. Each of the graphs 600-1 and 600-2 comprises the same nodes 102-1, 102-2, 102-3, 102-4, 102-5 and 102-6 that are included in FIGS. 3A-3B, FIG. 4, and FIGS. 5A-5B.

Example 5

Consider the graph 600-1 in FIG. 6A. The nodes in graph 600-1 are distributed in descending order. Since node $e_5$ has the highest score, node $e_5$ is the first to be processed. Node $e_5$'s score of 1 is used to compute the upper bounds of node $e_5$'s 1-hop nodes (i.e., $e_3$ and $e_6$). Since node $e_3$ has three unknown nodes as 1-hop neighbors, node $e_3$'s aggregate upper bound is calculated according to Equation 3 to be 1+0.2+3*1=4.2. Similarly, the aggregate upper bound of $e_6$ is 1+0.2+0*1=1.2. The next node to be processed according to the above-mentioned descending order is $e_1$, which has a score of 0.5. The aggregate upper bound of node $e_3$ can then be further reduced, because $e_3$ has seen two nodes. The aggregate upper bound of node $e_3$ becomes 1+0.5+0.2+2*0.5=2.7.

Algorithm 5 outlines the backward algorithm with partial distribution, which consists of two steps:

Step 1 (backward processing): The goal of Step 1 is to do backward processing to compute upper bounds for nodes. Lines 1-12 in Algorithm 5 show the pseudocode for a backward processing using partial distribution. K(v) in line 5 tracks the number of nodes already processed among a given node's neighbors and corresponds to the l in equation 3. In Step 1, all the scores do not need to be distributed. Instead, partial distribution is done only on a subset of nodes whose score is higher than a predefined threshold γ. In one embodiment, an optimal γ is selected so that only a small number of nodes are backward distributed, while the estimated upper bounds are tight enough for fast pruning in Step 2 (see Algorithm 5, line 14). Section 4.2 presented below discusses how to automatically select γ with mathematical modeling and sampling.

Step 2 (forward processing): In Step 2, all the nodes are ordered according to their aggregate upper bound values. Then a forward processing is done similar (but not identical) to the first forward processing in Algorithm 1. Lines 13-24 in Algorithm 5 show the pseudocode for the forward processing. A major difference from Algorithm 1 is that in the forward processing in Algorithm 5, if a node's aggregate upper bound is found to be below the topklbound, the processing of Algorithm 5 stops and returns the top-k result (see Algorithm 5, lines 16-18), since all the remaining nodes in Q can be skipped.

---

Algorithm 5 - Backward Processing using Partial Distribution

Partial Backward (G, γ)
Output: Top k (node, aggr_value) pairs
1:   F(u)=0, K(u)=0 for all nodes u
2:   for each node u, f(u) ≧ γ do
3:     for each node v in u's h-hops do
4:       F(v) = F(v) + f(u)
5:       K(v) = K(v) + 1
6:       if f(v) < γ then
7:         $\overline{F}$(v) = F(v) + f(v) + f(u) * (N(v) − K(v) − 1)
8:       else
9:         $\overline{F}$(v) = F(v) + f(u) * (N(v) − K(v))
10:      end if
11:    end for
12:  end for
13:  Add G's nodes into a priority queue Q according to $\overline{F}$(u)
14:  while Q is not empty do
15:    u = the top node of Q
16:    if $\overline{F}$(u) ≦ topklbound then
17:      continue
18:    end if
19:    F(u) = u's aggregate value in h-hops
20:    if F(u) > topklbound then
21:      update topklist with (u, F(u))
22:      update topklbound
23:    end if
24:  end while

---

In one embodiment, the steps of Algorithm 5 are performed by local neighborhood aggregation query processing engine 114 (see FIG. 1).

The backward processing using partial distribution approach is orthogonal to the differential index-based pruning techniques in forward processing. These two approaches can be combined together.

4.2 Distribution Ratio

The cost and the pruning power of the backward distribution approach depends on the setting of the partial distribution parameter γ. This section describes how to decide on a distribution ratio (i.e., decide on a best γ value) to ensure that Algorithm 5 has optimal performance. Assume that only p|V| nodes with the highest relevance scores are distributed. If q|V| nodes can be removed with forward pruning, then the cost of backward distribution is written as:

$$p|V|T + q|V| + (1-q)|V|T \approx (1-(q-p))|V|T, \quad (5)$$

where T is the average time of searching the h-hop neighbors of a node.

In order to minimize the cost shown in Equation 5, q–p must be maximized. q–p is neither monotonic nor anti-monotonic with respect to p. q–p has a maximal value between 0 and 1. By identifying this maximal value, Equation 5 can be minimized for better performance.

There are two approaches to find optimal p, with which the cut value γ can be quickly identified. In one embodiment, given the distribution D of the relevance function, which can be obtained by one scan over all the nodes in a graph, a model is built to capture the distribution of F(u). Based on the graph structure, an average neighborhood structure is built (e.g., the average number of 1-hop friends, 2-hop friends, . . . , h-hop friends), and relevance scores randomly drawn from D are then assigned to the friends in the average neighborhood structure. From this average neighborhood structure, the distribution of F(u) is estimated without accessing the original graph. F(u) helps to determine the cut value γ.

In an alternate embodiment, another approach directly estimates the distribution of q–p with respect to p. The idea is to sample m nodes randomly from graph G and find their h-hop neighbors. Let k'=⌈p*k⌉, where k is the number of top-k aggregates. The real cost is calculated by varying p from small to large and choosing the optimal $p_o$ which corresponds to the maximal q–p value.

4.3 Enhanced Backward Processing

Algorithm 5 explicitly separates backward processing and forward processing as two steps. It is possible to conduct backward processing and forward processing simultaneously. That is, when a node u is being backward distributed, for each of node u's h-hops node v, not only is v's aggregate upper bound computed (i.e., the backward processing), but also v's score is added to u's aggregate value (i.e., the forward processing).

Figure 7A:
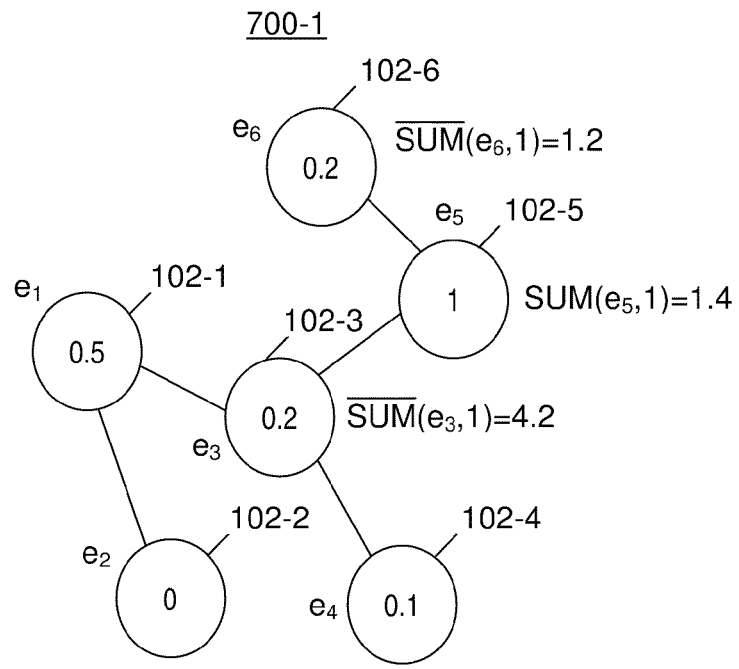
FIGS. 7A-7B depict nodes of a graph for which an example of enhanced backward processing is applied to a local neighborhood aggregation query, where the enhanced backward processing is included in the process of FIG. 2, in accordance with embodiments of the present invention.
Figure 7B:
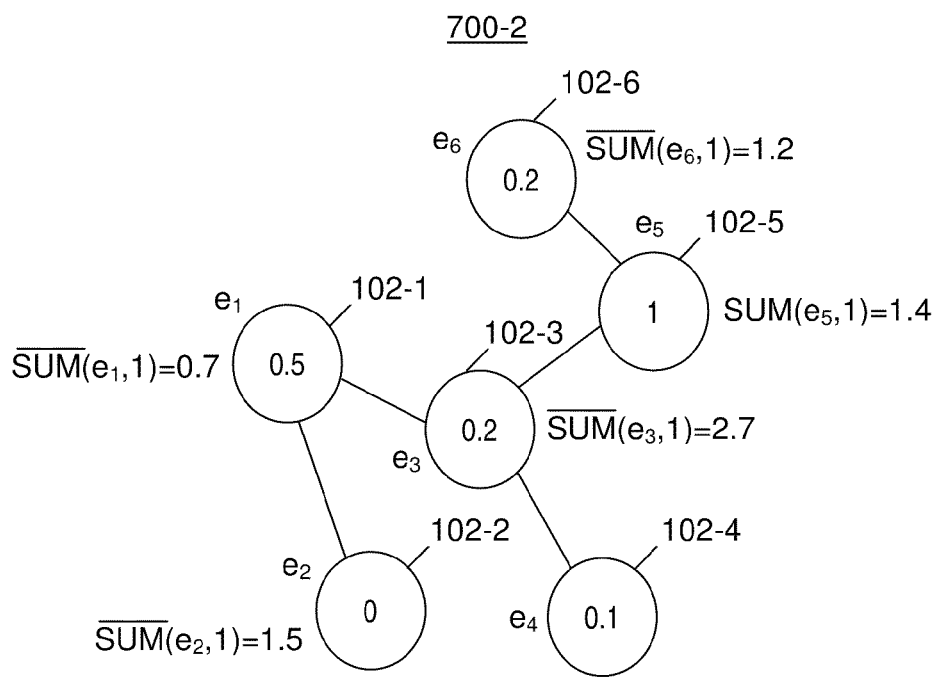

FIGS. 7A-7B depict nodes of a graph for which an example of enhanced backward processing is applied to a local neighborhood aggregation query, where the enhanced backward processing is included in the process of FIG. 2, in accordance with embodiments of the present invention. FIG. 7A and FIG. 7B include graphs 700-1 and 700-2, respectively. Each of the graphs 700-1 and 700-2 comprises the same nodes 102-1, 102-2, 102-3, 102-4, 102-5 and 102-6 that are included in FIGS. 3A-3B, FIG. 4, FIGS. 5A-5B, and FIGS. 6A-6B.

Example 6

Consider the graph 700-1 in FIG. 7A. Again, $e_5$ has the highest score, and thus is the first node to be processed. Node $e_5$'s score of 1 is used to compute the upper bounds of its 1-hop nodes except $e_5$ itself. The upper bounds are the same as the ones in FIG. 6A. However, for node $e_5$, instead of doing upper bound computation, a forward processing is done to obtain $e_5$'s aggregate value as SUM($e_5$,1)=1.4. Similarly, in graph 700-2 in FIG. 7B, node $e_1$ is then processed with both back backward and forward processing.

Algorithm 6 describes a complete enhanced backward processing algorithm (a.k.a. LONA-Backward). In one embodiment, the steps of Algorithm 6 are performed by local neighborhood aggregation query processing engine 114 (see FIG. 1). Algorithm 6 still works in the two steps presented below, but the first step involves both backward and forward processing. In this way, Step 1 collects top-k candidates and computes aggregate upper bounds, thereby saving time on Step 2. Algorithm 6 also includes the differential index-based pruning strategy presented in Algorithm 3.

Step 1 of Algorithm 6 (i.e., the mixed processing of both backward and forward processing): The goal of Step 1 of Algorithm 6 is to do both backward and forward processing. Lines 1-20 in Algorithm 6 show the pseudocode for the above-mentioned mixed processing. γ is still used to select a subset of nodes to process. Lines 5-7 in Algorithm 6 show the forward processing of a node. Lines 8-12 in Algorithm 6 show the backward processing to compute the upper bounds. In this case, only Equation 3 is needed, because if a node is processed, the node's aggregate value is already computed and thus there is no need to compute the node's upper bound anymore. Top-k candidates are generated in Step 1 (Algorithm 6, lines 14-17). Differential index-based pruning can also be optionally applied (Algorithm 6, lines 18-19) if the index is available.

Step 2 of Algorithm 6 (forward processing): Comparing to Algorithm 5, a major difference in Step 2 of the enhanced Algorithm 6 is which nodes are selected to build the priority queue Q (Algorithm 6, line 21). In Algorithm 5, all the nodes are added into Q. But in Algorithm 6, nodes are added into Q only if the nodes satisfy the following conditions: (1) the nodes have not been forward processed in Step 1 of Algorithm 6, (2) the nodes are not in prunedlist, and (3) the nodes have aggregate upper bounds larger than the top-k lower bound topklbound. Such a selection of nodes to be added into Q may prune a substantial number of remaining nodes for Step 2 of Algorithm 6.

| Algorithm 6 - Enhanced Backward Processing |
|---|
| LONA-Backward (G, γ) |
| Output: Top k (node, aggr_value) pairs |
| 1:   topklist={ }, topklbound=0, prunedlist={ } |
| 2:   F(u)=0, K(u)=0 for all nodes u |
| 3:   for each node u, f(u) ≧ γ do |
| 4:       for each node v in u's h-hops do |
| 5:           F(u) = F(u) + f(v) |
| 6:           F(v) = F(v) + f(u) |
| 7:           K(v) = K(v) + 1 |
| 8:           if f(v) < γ then |
| 9:               F̄(v) = F(v) + f(v) + f(u) * (N(v) − K(v) − 1) |
| 10:          else |
| 11:              F̄(v) = F(v) + f(u) * (N(v) − K(v)) |
| 12:          end if |
| 13:      end for |
| 14:      if F(u) > topklbound then |
| 15:          update topklist with (u, F(u)) |
| 16:          update topklbound |
| 17:      end if |
| 18:      pnodes = pruneNodes(u, F(u), G, topklbound) |
| 19:      add nodes from pnodes into prunedlist |
| 20: end for |
| 21: For all nodes u, such that f(u) < γ, u ∉ prunedlist and F̄(u) > topklbound, add them into a priority queue Q according to F̄(u) |
| 22: while Q is not empty do |
| 23:     u = get the top node of Q |
| 24:     if F̄(u) < topklbound then |
| 25:         return topklist |
| 26:     end if |
| 27:     if u not in prunedlist then |
| 28:         F(u) = u's aggregate value in h-hops |
| 29:         if F(u) > topklbound then |
| 30:             update topklist with (u, F(u)) |
| 31:             update topklbound |
| 32:         end if |
| 33:         pnodes = pruneNodes(u, F(u), G, topklbound) |
| 34:         add nodes from pnodes into prunedlist |

Algorithm 6 - Enhanced Backward Processing

```
35:   end if
36: end while
```

4.4 LONA Framework

With differential index-based pruning for forward processing and partial aggregation based pruning for backward processing, the LONA framework is built to answer neighborhood aggregation queries over large-scale networks. The LONA framework includes three components, C1, C2 and C3:

C1. Probing the underlying network to determine the need of backward distribution. If there is a need for backward distribution, determine the partial distribution ratio p, and the corresponding cut value γ.

C2. Backward distribution: distribute the p|V| highest values of $f(u)$, $\forall u \in V(G)$ C3. Forward pruning: Using the partial aggregation and differential index to prune nodes whose aggregation upper bound is less than the lowest top-k values found so far.

In the LONA framework, the first step is to determine if the backward distribution technique should be employed for a given graph, relevance function $f$, aggregate function F and parameter k. Section 4.2 discusses the selection of partial distribution ratio p. This process also estimates the maximum pruning ratio, q−p. In one embodiment, processing engine 114 (see FIG. 1) determines whether the maximum pruning ratio is low according to predefined criteria (i.e., below a predefined threshold level; e.g., below 50%). If the maximum pruning ratio is determined to be low according to the predefined criteria, the user is informed by computer system 100 (see FIG. 1) that there is no need to apply backward processing. In the case in which the maximum pruning ratio is determined to be low, the processing engine 114 (see FIG. 1) may automatically run the forward processing approach of Algorithm 2.

5. Computer System

Returning to FIG. 1, computer system 100 implements the processes of FIG. 2, Algorithm 1, Algorithm 2, Algorithm 3, Algorithm 4, Algorithm 5, and/or Algorithm 6 by carrying out instructions included in the program code of the local neighborhood aggregation query processing engine 114. Again, computer system 100 generally comprises CPU 102, memory 104, I/O interface 106, and bus 108, and may be coupled to I/O devices 110 and a computer data storage unit 112. CPU 102 performs computation and control functions of computer system 100. CPU 102 may comprise a single processing unit, or be distributed across one or more processing units in one or more locations (e.g., on a client and server).

Memory 104 may comprise any known computer readable storage medium, which is described below. In one embodiment, cache memory elements of memory 104 provide temporary storage of at least some program code (e.g., program code of processing engine 114) in order to reduce the number of times code must be retrieved from bulk storage while instructions of the program code are carried out. Moreover, similar to CPU 102, memory 104 may reside at a single physical location, comprising one or more types of data storage, or be distributed across a plurality of physical systems in various forms. Further, memory 104 can include data distributed across, for example, a local area network (LAN) or a wide area network (WAN).

I/O interface 106 comprises any system for exchanging information to or from an external source. I/O devices 110 comprise any known type of external device, including a display device (e.g., monitor), keyboard, mouse, printer, speakers, handheld device, facsimile, etc. Bus 108 provides a communication link between each of the components in computer system 100, and may comprise any type of transmission link, including electrical, optical, wireless, etc.

I/O interface 106 also allows computer system 100 to store and retrieve information (e.g., data or program instructions such as program code of processing engine 114) from an auxiliary storage device such as computer data storage unit 112 or another computer data storage unit (not shown). Computer data storage unit 112 may comprise any known computer readable storage medium, which is described below. For example, computer data storage unit 112 may be a non-volatile data storage device, such as a magnetic disk drive (i.e., hard disk drive) or an optical disc drive (e.g., a CD-ROM drive which receives a CD-ROM disk).

Memory 104 may include computer program code of processing engine 114 that provides the logic for determining nodes of a graph that answer a local neighborhood aggregation query (e.g., the processes of FIG. 2 and Algorithms 1-6, or any combination thereof). Further, memory 104 may include other systems not shown in FIG. 1, such as an operating system (e.g., Linux) that runs on CPU 102 and provides control of various components within and/or connected to computer system 100.

As will be appreciated by one skilled in the art, the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system" (e.g., computer system 100). Furthermore, an embodiment of the present invention may take the form of a computer program product embodied in one or more computer readable medium(s) (e.g., memory 104 or computer data storage unit 112) having computer readable program code (e.g., program code of processing engine 114) embodied or stored thereon Any combination of one or more computer readable medium(s) (e.g., memory 104 and computer data storage unit 112) may be utilized. The computer readable medium may be a computer readable storage medium or a computer readable signal medium. A computer readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with a system, apparatus, or device for carrying out instructions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code of processing engine 114) embodied on a computer readable medium may be transmitted using any appropriate medium, including but not limited to wireless, wireline, optical fiber cable, RF, etc., or any suitable combination of the foregoing.

Computer program code (e.g., program code of processing engine 114) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 100 or another computer system (not shown) having components analogous to the components of computer system 100 included in FIG. 1. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2), algorithms (e.g., Algorithms 1-6) and/or block diagrams of methods, apparatus (systems) (e.g., FIG. 1), and computer program products according to embodiments of the invention. It will be understood that each algorithm and each block of the flowchart illustrations and/or block diagrams, and combinations of algorithms and blocks in the flowchart illustrations and/or block diagrams, can be implemented by computer program instructions (e.g., program code of processing engine 114). These computer program instructions may be provided to a processor (e.g., CPU 102) of a general purpose computer, special purpose computer, or other programmable data processing apparatus to produce a machine, such that the instructions, which are carried out via the processor of the computer or other programmable data processing apparatus, create means for implementing the functions/acts specified in the algorithm(s), flowchart and/or block diagram block or blocks.

These computer program instructions may also be stored in a computer readable medium (e.g., memory 104 or computer data storage unit 112) that can direct a computer (e.g., computer system 100), other programmable data processing apparatus, or other devices to function in a particular manner, such that the instructions stored in the computer readable medium produce an article of manufacture including instructions which implement the function/act specified in the algorithm(s), flowchart and/or block diagram block or blocks.

The computer program instructions may also be loaded onto a computer (e.g., computer system 100), other programmable data processing apparatus, or other devices to cause a series of operational steps to be performed on the computer, other programmable apparatus, or other devices to produce a computer implemented process such that the instructions which are carried out on the computer, other programmable apparatus, or other devices provide processes for implementing the functions/acts specified in the algorithm(s), flowchart and/or block diagram block or blocks.

Any of the components of an embodiment of the present invention can be deployed, managed, serviced, etc. by a service provider that offers to deploy or integrate computing infrastructure with respect to the process of determining nodes of a graph that answer a local neighborhood aggregation query. Thus, an embodiment of the present invention discloses a process for supporting computer infrastructure, comprising integrating, hosting, maintaining and deploying computer-readable code (e.g., program code of processing engine 114) into a computer system (e.g., computer system 100), wherein the code in combination with the computer system is capable of performing a process of determining nodes of a graph that answer a local neighborhood aggregation query.

In another embodiment, the invention provides a business method that performs the process steps of the invention on a subscription, advertising and/or fee basis. That is, a service provider, such as a Solution Integrator, can offer to create, maintain, support, etc. a process of determining nodes of a graph that answer a local neighborhood aggregation query. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The Algorithms 1-6, the flowchart in FIG. 2 and the block diagrams in FIG. 1 illustrate the architecture, functionality, and operation of possible implementations of systems, methods, and computer program products according to various embodiments of the present invention. In this regard, each step in an algorithm and each block in the flowcharts or block diagrams may represent a module, segment, or portion of code (e.g., program code of processing engine 114), which comprises one or more executable instructions for implementing the specified logical function(s). It should also be noted that, in some alternative implementations, the functions noted in the block or step may occur out of the order noted in the figures. For example, two blocks shown in succession may, in fact, be performed substantially concurrently, or the blocks may sometimes be performed in reverse order, depending upon the functionality involved. It will also be noted that each step of the Algorithms 1-6 and each block of the block diagrams and/or flowchart illustrations, and combinations of steps in the algorithms and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of determining a list of k nodes of a graph that have top-k highest aggregate scores over neighboring nodes within h-hops of said k nodes by using forward processing steps, said method comprising:
   a computer system obtaining a next node u of said graph, wherein at least one node of said graph is not in a list of pruned nodes;

if said next node u is not in said list of pruned nodes then a processor of said computer system performing said forward processing steps of:
  determining an aggregate score of said u by performing an aggregation operation that includes adding an initial score of said u to initial scores of neighboring nodes within h-hops of said u;
  if said aggregate score of said u is greater than a lower bound of aggregate scores of said k nodes, then adding said u to said list of k nodes and updating said lower bound of said aggregate scores of said k nodes;
  pruning one or more neighboring nodes within h-hops of said u, wherein said pruning is based, in part, on a differential index between a neighboring node of said one or more neighboring nodes and said u and based, in part, on an upper bound of an aggregate score of said neighboring node; and
  adding said one or more neighboring nodes to said list of pruned nodes; and
repeating said obtaining said next node and said performing said forward processing if said next node is not in said list of pruned nodes until every node of said graph is obtained as said next node by said obtaining.

2. The method of claim 1, wherein said aggregation operation is a summing operation or an averaging operation, and wherein said pruning includes:
for each neighboring node v within h-hops of said u, iteratively performing the following steps:
  if said aggregation operation is said summing operation then determining an upper bound of an aggregate score of said v as:

$$\min(F(u)+\text{delta}(v-u), N(v)-1+f(v));$$

else if said aggregation operation is said averaging operation then determining said upper bound of said aggregate score of said v as:

$$\frac{\min(F(u)+\text{delta}(v-u), N(v)-1+f(v))}{N(v)},$$

wherein said F(u) is said aggregate score of said u, said delta(v−u) is said differential index, said N(v) is a number of neighboring nodes within h-hops of said v, and said $f(v)$ is an initial score of said v, wherein said differential index is a number of nodes in S(v) but not in S(u), wherein said S(v) is a set of distinct neighboring nodes within h-hops from said v, and wherein said S(u) is a set of distinct neighboring nodes within h-hops from said u; and
  if said upper bound of said aggregate score of said v is less than or equal to said lower bound of said aggregate scores of said k nodes then adding said v into said list of pruned nodes.

3. The method of claim 1, further comprising ordering a plurality of nodes of said graph in a priority queue Q, wherein said obtaining said next node u of said graph includes obtaining a next top node in Q while Q is not empty, and wherein said next node u, said one or more neighboring nodes within h-hops of said u, and said neighboring nodes within h hops of said u are included in said plurality of nodes.

4. The method of claim 3, wherein said ordering said plurality of nodes includes ordering each node u of said plurality of nodes in descending order according to N(u), wherein said N(u) is a number of neighboring nodes within h-hops of said u.

5. A computer system comprising a processor, a computer readable memory, a computer readable storage medium, and program instructions stored on said computer readable storage medium, said program instructions configured to be carried out by said processor via said computer readable memory to implement the method of claim 1.

6. A computer program product, comprising a computer readable storage medium having a computer readable program code stored therein, said computer readable program code containing instructions configured to be carried out by a processor of a computer system to implement the method of claim 1.

7. A computer-implemented method of determining a list of k nodes of a graph that have top-k highest aggregate scores over neighboring nodes within h-hops of said k nodes by using backward processing steps with a partial distribution and forward processing steps, said method comprising:
a computer system obtaining a next node u of said graph for said partial distribution on a subset of nodes of said graph for which $f(u) \geq \gamma$, wherein said $f(u)$ is an initial score of said u, and wherein said $\gamma$ is a predefined partial distribution threshold;
for each node v within h-hops of said u, a processor of said computer system performing said backward processing steps that include determining an upper bound of an aggregate score of said v;
said computer system repeating said obtaining said next node and said performing said backward processing until every node of said graph for which $f(u) \geq \gamma$ is obtained as said next node by said obtaining; and
subsequently, said computer system performing said forward processing steps that include:
  determining an aggregate score of said u by performing an aggregation operation that includes adding an initial score of said u to initial scores of neighboring nodes within h-hops of said u; and
  if said aggregate score of said u is greater than a lower bound of aggregate scores of said k nodes, then adding said u to said list of k nodes and updating said lower bound of said aggregate scores of said k nodes.

8. The method of claim 7, wherein said determining said upper bound of said aggregate score of said v includes:
updating F(v) to be F(v)+$f$(u), wherein said F(v) is said aggregate score of said v;
updating K(v) to be K(v)+1, wherein said K(v) tracks a number of nodes among neighboring nodes of said v that are already processed by said determining said F(v); and
if $f(v) < \gamma$ then calculating said upper bound of said F(v) as:

$$F(v)+f(v)+f(u)*(N(v)-K(v)-1)$$

else calculating said upper bound of said F(v) as:

$$F(v)+f(u)*(N(v)-K(v)),$$

wherein said $f(v)$ is an initial score of said v and said N(v) is a number of neighboring nodes within h-hops of said v.

9. The method of claim 7, wherein said performing said forward processing steps further includes:
ordering a plurality of nodes of said graph in a priority queue Q; and
while said Q is not empty, obtaining said u as a next top node in said Q and stopping said forward processing steps if an upper bound of an aggregate score of said u is less than or equal to said lower bound of said aggregate scores of said k nodes, wherein said u, said v, said subset of nodes of said graph, said neighboring nodes within h-hops of said v, and said neighboring nodes within h-hops of said u are included in said plurality of nodes.

10. A computer system comprising a processor, a computer readable memory, a computer readable storage medium, and program instructions stored on said computer readable storage medium, said program instructions configured to be carried out by said processor via said computer readable memory to implement the method of claim 7.

11. A computer program product, comprising a computer readable storage medium having a computer readable program code stored therein, said computer readable program code containing instructions configured to be carried out by a processor of a computer system to implement the method of claim 7.

12. A computer-implemented method of determining a list of k nodes of a graph that have top-k highest aggregate scores over neighboring nodes within h-hops of said k nodes by using backward processing steps with a partial distribution, a first set of forward processing steps, and a second set of forward processing steps, said method comprising:

a computer system obtaining in a first loop a next node u of said graph for said partial distribution on a subset of nodes of said graph for which $f(u) \geq \gamma$, wherein said $f(u)$ is an initial score of said u, and wherein $\gamma$ is a predefined partial distribution threshold;

for each node v within h-hops of said u, a processor of said computer system performing said backward processing steps that include determining an upper bound of an aggregate score of said v;

subsequent to said performing said backward processing steps, said computer system performing said first set of forward processing steps that include:

determining an aggregate score of said u by performing an aggregation operation that includes adding an initial score of said u to initial scores of neighboring nodes within h-hops of said u;

if said aggregate score of said u is greater than a lower bound of aggregate scores of said k nodes, then adding said u to said list of k nodes and updating said lower bound of said aggregate scores of said k nodes;

pruning one or more neighboring nodes within h-hops of said u, wherein said pruning said one or more neighboring nodes is based, in part, on a differential index between a neighboring node of said one or more neighboring nodes and said u and based, in part, on an upper bound of an aggregate score of said neighboring node; and adding said one or more neighboring nodes to said list of pruned nodes;

repeating said obtaining in said first loop, said performing said backward processing and said performing said first set of forward processing steps until every node of said graph for which $f(u) \geq \gamma$ is obtained as said next node u by said obtaining in said first loop;

said computer system obtaining in a second loop a next top node u of said graph from a priority queue Q after determining said $f(u) < \gamma$, said next top node u is not in said list of pruned nodes, and an upper bound of said aggregate score of said next top node u is greater than said lower bound of said aggregate scores of said k nodes;

in response to determining said next top node u is not in said list of pruned nodes, said computer system performing said second set of forward processing steps of:

determining said aggregate score of said next top node u;

if said aggregate score of said next top node u is greater than a lower bound of said aggregate scores of said k nodes, then adding said next top node u to said list of k nodes and updating said lower bound of said aggregate scores of said k nodes;

pruning a second one or more neighboring nodes within h-hops of said next top node u, wherein said pruning said second one or more neighboring nodes is based, in part, on a differential index between a second neighboring node of said second one or more neighboring nodes and said next top node u and based, in part, on an upper bound of an aggregate score of said second neighboring node; and adding said second one or more neighboring nodes to said list of pruned nodes; and repeating said obtaining said next top node and said performing said second set of forward processing until every node of said graph is processed by said obtaining said next top node.

13. The method of claim 12, wherein said determining said upper bound of said aggregate score of said v includes:

updating $F(u)$ to be $F(u)+f(v)$, wherein said $F(u)$ is an aggregate score of said u, and wherein said $f(v)$ is an initial score of said v;

updating $F(v)$ to be $F(v)+f(u)$, wherein said $F(v)$ is said aggregate score of said v;

updating $K(v)$ to be $K(v)+1$, wherein said $K(v)$ tracks a number of nodes among neighboring nodes of said v that are already processed by said determining said $F(v)$; and if $f(v) < \gamma$ then calculating said upper bound of said $F(v)$ as:

$$F(v)+f(v)+f(u)*(N(v)-(v)-1)$$

else calculating said upper bound of said $F(v)$ as:

$$F(v)+f(u)*(N(v)-K(v)),$$

wherein said $N(v)$ is a number of neighboring nodes within h-hops of said v.

14. The method of claim 12, wherein said performing said second set of forward processing steps further includes:

ordering a plurality of nodes of said graph in said priority queue Q; and while said Q is not empty, performing obtaining in said second loop said next top node u in said Q and stopping said second set of forward processing steps if an upper bound of said aggregate score of said u is less than said lower bound of said aggregate scores of said k nodes, wherein said next node u, said next top node u, said v, said subset of nodes of said graph, said one or more neighboring nodes within h-hops of said u, and said second one or more neighboring nodes within h-hops of said next top node u are included in said plurality of nodes.

15. The method of claim 12, wherein said aggregation operation is a summing operation or an averaging operation, and wherein said pruning said one or more neighboring nodes includes:

for each neighboring node v within h-hops of said u, iteratively performing the following steps:

if said aggregation operation is said summing operation then determining an upper bound of an aggregate score of said v as:

$$\min(F(u)+\text{delta}(v-u),N(v)-1+f(v));$$

else if said aggregation operation is said averaging operation then determining said upper bound of said aggregate score of said v as:

$$\frac{\min(F(u) + \text{delta}(v-u), N(v) - 1 + f(v))}{N(v)},$$

wherein said F(u) is said aggregate score of said u, said delta(v−u) is said differential index, said N(v) is a number of neighboring nodes within h-hops of said v, and said ƒ(v) is an initial score of said v, wherein said differential index is a number of nodes in S(v) but not in S(u), wherein said S(v) is a set of distinct neighboring nodes within h-hops from said v, and wherein said S(u) is a set of distinct neighboring nodes within h-hops from said u; and if said upper bound of said aggregate score of said v is less than or equal to said lower bound of said aggregate scores of said k nodes then adding said v into said list of pruned nodes.

16. A computer system comprising a processor, a computer readable memory, a computer readable storage medium, and program instructions stored on said computer readable storage medium, said program instructions configured to be carried out by said processor via said computer readable memory to implement the method of claim 12.

17. A computer program product, comprising a computer readable storage medium having a computer readable program code stored therein, said computer readable program code containing instructions configured to be carried out by a processor of a computer system to implement the method of claim 12.

* * * * *